US006364925B1

(12) United States Patent
Markusch et al.

(10) Patent No.: US 6,364,925 B1
(45) Date of Patent: Apr. 2, 2002

(54) POLYURETHANE ENCAPSULATED FERTILIZER HAVING IMPROVED SLOW-RELEASE PROPERTIES

(75) Inventors: Peter H. Markusch, McMurray, PA (US); Robert L. Cline, Paden City, WV (US); Ashok M. Sarpeshkar, Upper St. Clair, PA (US); Robert P. Yeater, Moundsville, WV (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 09/458,818

(22) Filed: Dec. 10, 1999

(51) Int. Cl.$^7$ .................................................. C05G 5/00
(52) U.S. Cl. ...................... 71/64.07; 71/64.11
(58) Field of Search .............................. 71/64.07, 64.11; 427/214

(56) References Cited

U.S. PATENT DOCUMENTS

| | | | |
|---|---|---|---|
| 3,259,482 A | 7/1966 | Hansen | 71/64 |
| 3,264,088 A | 8/1966 | Hansen | 71/64 |
| 3,264,089 A | 8/1966 | Hansen | 71/64 |
| 3,342,577 A | 9/1967 | Blouin et al. | 71/3 |
| 3,475,154 A | 10/1969 | Kato | 71/64 |
| 4,369,055 A | 1/1983 | Fujita et al. | 71/64.11 |
| 4,711,659 A | 12/1987 | Moore | 71/93 |
| 4,772,490 A | 9/1988 | Kogler et al. | 427/212 |
| 4,804,403 A | 2/1989 | Moore | 71/28 |
| 4,969,947 A | 11/1990 | Moore | 71/28 |
| 5,176,734 A | 1/1993 | Fujita et al. | 71/11 |
| 5,206,341 A | 4/1993 | Ibay et al. | 528/361 |
| 5,219,465 A | 6/1993 | Goertz et al. | 71/28 |
| 5,312,865 A | * 5/1994 | Hoefer et al. | 524/591 |
| 5,374,292 A | 12/1994 | Detrick et al. | 71/28 |
| 5,399,186 A | 3/1995 | Derrah et al. | 71/64.02 |
| 5,538,531 A | 7/1996 | Hudson et al. | 71/28 |
| 5,547,486 A | 8/1996 | Detrick et al. | 71/28 |
| 5,599,374 A | 2/1997 | Detrick | 71/28 |
| 5,645,624 A | 7/1997 | Naka et al. | 71/64.07 |
| 5,704,962 A | 1/1998 | Navascues | 71/64.07 |
| 5,851,261 A | 12/1998 | Markusch et al. | 71/64.07 |
| 6,039,781 A | * 3/2000 | Goertz et al. | 71/1 |
| 6,165,550 A | * 12/2000 | Markusch et al. | 427/221 |
| 6,176,891 B1 | 1/2001 | Komoriya et al. | 71/11 |

FOREIGN PATENT DOCUMENTS

| | | |
|---|---|---|
| EP | 867422 | 9/1998 |
| JP | 52-38361 | 3/1977 |
| JP | 3-146492 | 6/1991 |
| JP | 5-97561 | 4/1993 |
| JP | 10-29886 | 2/1998 |
| JP | 10029886 | * 2/1998 |
| JP | 10324587 | * 12/1998 |

* cited by examiner

Primary Examiner—Chhaya D. Sayala
(74) Attorney, Agent, or Firm—Joseph C. Gil; N. Denise Brown

(57) ABSTRACT

The present invention relates to polyurethane encapsulated fertilizer particles which exhibit slow-release properties and to a process for their production. The process comprises applying an isocyanate-reactive component to fertilizer particles, to form fertilizer particles coated with an isocyanate-reactive component, applying a polyisocyanate component onto the coated fertilizer particles to form polyurethane encapsulated fertilizer particles, and, optionally, repeating these steps as many times as necessary to form the polyurethane encapsulated fertilizer particles that contain about 2 to 20% by weight of polyurethane, based on the total weight of the encapsulated fertilizer particles. Suitable isocyanate-reactive components include polyesterether polyols that comprise either a blend of or the reaction product of (i) castor oil having an OH number of about 160 to about 170, a viscosity of about 500 to about 900 mPa.s at 25° C., and a water content of less than 0.5% by weight; and (ii) a polyether polyol having an OH number of from 28 to 700, a functionality of from 3 to 8, and a molecular weight of about 240 to about 6,000, and a viscosity of from about 50 to 35,000 mPa.s at 25° C. The polyether polyol must be prepared from a suitable initiator compound and an alkylene oxide comprising at least 70% by weight of propylene oxide.

48 Claims, No Drawings

POLYURETHANE ENCAPSULATED FERTILIZER HAVING IMPROVED SLOW-RELEASE PROPERTIES

BACKGROUND OF THE INVENTION

This invention relates to polyurethane encapsulated fertilizers exhibiting improved slow-release properties and to a process for the production of these polyurethane encapsulated fertilizers.

Commercial particulate fertilizers are produced and marketed in several different particle types, i.e., granular, pelletized, dusts, pilled, and prilled fertilizers. Also, they may be formed of inorganic substances, organic substances, or combinations thereof. The improvements of the present invention can be applied to any of these types of particulate fertilizers.

In order to be effective in promoting plant growth, fertilizers must contain some amount of water soluble plant nutrients. These are typically in the form of water soluble compounds of nitrogen, phosphorus and potassium, alone or in combination, and often in conjunction with other elements, such as, for example, calcium, boron, magnesium, zinc, chlorine, etc. Such particulate fertilizers can be made of a single component, e.g., urea, ammonium nitrate, potassium chloride, etc., or of multiple components often mixed with inert water soluble or water insoluble materials as in common fertilizers designated as 6-6-6, 4-6-4, 10-10-10, 20-20-5, 14-16-0, 5-20-20, and the like. In addition, specialized fertilizers may contain optional additives such as herbicides, insecticides, trace elements, iron salts, sulfur, etc. The improvements of the present invention can be applied to any of these fertilizers.

Historically, particulate fertilizers possessed a number of known defects, the most notable being the too rapid release of soluble plant food, causing phytotoxicity and the rapid depletion of the plant nutrients by leaching. Other problems included tendencies to cake and form dust. These problems are well documented in previous patents that professed solutions to one or more of the known defects, including U.S. Pat. Nos. 3,475,154, 3,259,482, 3,264,088, 3,264,089, 4,711,659, 4,772,490 and Japanese Patent 52-38361. The present invention provides additional improvements in the construction of particulate fertilizers which render them highly attrition resistant and further extended release properties.

A number of slow release coatings for particular fertilizers have previously been proposed. The process of sulfur coating urea particles is described in U.S. Pat. No. 3,342,577 and was developed in the late 1960's by the Tennessee Valley Authority (TVA) as an economical system for reducing the rate of dissolution when urea particles are applied to the soil as fertilizer. This process requires high levels of sulfur, which reduces the nutrient analysis of the fertilizer particles, and even then, imperfections remain in the coating, making it necessary to apply a sealant coating, which is composed of a mixture of 30% polyethylene resin in a 70% bright stock mineral oil.

Attempts to seal the sulfur coating have been described in U.S. Pat. No. 5,219,465. Topcoats are formed on the sulfur layer using various polymers which include a polyurethane based on polymethylene poly(phenyl-isocyanate) and polyester polyols. In this process, the addition of a catalyst is necessary to promote cure of the polyurethane on the surface.

U.S. Pat. No. 5,599,374 relates to a process for producing sulfur-coated low release fertilizers which have improved impact and abrasion resistance properties. This process applies liquid monomers sequentially onto the surface of hot sulfur-coated urea granules, and copolymerizes these to form a firm, tack-free, water insoluble polymer coating sealant. Suitable liquid monomers are diisocyanates such as diphenylmethane diisocyanate, and a polyol mixture of diethylene glycol (DEG) and triethanolamine (TEOA). TEOA serves both as a reactive polyol and as a catalyst. This patent attempts to overcome the deficiencies of using sulfur alone to achieve slow release properties. The polyurethane serves to coat and cover the areas of the fertilizer particle not covered by the sulfur, and thus, provide improved time release properties.

Coatings in which preformed polymer resins are applied from solvents have been described in, for example, U.S. Pat. Nos. 3,475,154 and 3,264,089. The use of solvents creates a vapor hazard as the products are dried and the solvent evaporation step can result in pinhole imperfections in the coatings when applied.

U.S. Pat. No. 4,369,055 tried to facilitate degradation of coating materials while maintaining the function for controlling the dissolving-out rate by dispersing inorganic powders such as sulfur and talc in a low molecular weight olefin polymer. However, the disclosed coating materials are difficult to apply in uniform layers because the polymers must be maintained in the molten state.

Polyurethane coatings as disclosed in U.S. Pat. Nos. 4,711,659, 4,804,403, and 4,969,947 require that the substrate contains a minimum quantity of reactive $—NH_2$ groups. Thus, these are not applicable to all fertilizer compositions for which slow release properties may be desirable.

Coating of fertilizer compositions with a biodegradable polymer was described in U.S. Pat. Nos. 5,176,734 and 5,206,341 and Japanese Patent Application No. 146492/1991. These references disclose coating the fertilizer composition with a biodegradable coating material in a single layer. The single layer coating has difficulties controlling the dissolving-out rate of fertilizer nutrients while maintaining biodegradability simultaneously.

Japanese Patent Application No. 97561/1993 discloses a three layer coating which was prepared by using one type of biodegradable film and a water soluble resin. This coating also has difficulty in controlling both the dissolving-out rate and the biodegradability at the same time. The thickness of the coating material is disclosed as being from 500 to 2,000 $\mu$m. Such a coating material requires increased cost, thus making it questionable for commercial use.

Canadian Patent Application No. 2,135,788 relates to coating fertilizer compositions with at least two types of coating materials wherein the two coating materials have different dissolving-out rates and moisture permeability in a multi-layer structure.

U.S. Pat. No. 5,538,531 also describes controlled release fertilizers and a method for their production. These controlled release fertilizers have a central mass of particulate fertilizer which contains at least one water soluble plant nutrient surrounded by a plurality of coatings. The inner coating comprises the reaction product of (A) an aromatic polyisocyanate or derivatives thereof which contain about 1.5 to 3 NCO groups per molecule and an NCO group content of 10 to 50% by weight, and (B) a polyol having from 2 to 6 hydroxyl moieties and at least one alkyl moiety containing from about 10 to 22 carbon atoms. Suitable polyols include castor oil and hydrogenated castor oil. An outer coating is also necessary. The outer coating consists essentially of an organic wax having a drop melting point of between 50 and 120° C.

U.S. Pat. No. 5,645,624 describes an encapsulated fertilizer using first a layer of rapidly biodegradable aliphatic polyester and polyurethane compound followed by a slowly biodegradable layer based on cellulose derivatives and hydrocarbon compound to control the release rate of the fertilizer.

U.S. Pat. No. 5,704,962 describes compositions for treating granular fertilizers to reduce dust and reduce caking of the fertilizers during storage. These compositions comprise fatty monoamines, specifically fatty secondary dialkylamines or mixtures thereof with fatty primary amines.

U.S. Pat. No. 5,399,186 describes an apparatus and a process for coating fertilizer particles with a polymer. This process requires a multistage fluidized bed apparatus for the continuous coating of fertilizer substrate particles. This process produces coated fertilizers having a narrow coating thickness distribution and in which the substrate is prevented from absorbing moisture prior to being coated. Suitable coating materials include, for example, polyvinylidene chloride, polyvinyl chloride, low density polyethylene, epoxy resins, molten sulfur, wax, polyethylene, ammonium nitrate, sulfur, liquefied potassium nitrate, and two or more reactive materials that react to form a water barrier coating such as, for example, a polyol and an isocyanate.

A machine system and a process for the production of attrition resistant, controlled release fertilizers are described by U.S. Pat. Nos. 5,374,292 and 5,547,486. This process comprises coating a particular plant nutrient with a coating material which is chemically bonded to the nutrient, to provide a uniform coating that can be varied in thickness to effect various rates of release. In accordance with this process, particulate plant nutrients are subjected to a pretreatment prior to reaction with a coupling agent such as an organic diisocyanate. During the pretreatment, heated plant nutrient granules are subjected to water containing a polyol-catalyst and a water-soluble low molecular weight polyol, followed by concurrent or sequential pretreatment with additional low molecular weight or medium molecular weight polyester polyol. The plant nutrient granules are pretreated with water in a low molecular weight polyol first, followed by triethanolamine, and finally the polyisocyanate and the polyethylene terephthalate polyester polyol. Pretreatment is believed to raise the reactive functional groups of the particulate water-soluble plant nutrient at the surface for enhanced molecular contact for rapid and more efficient subsequent reaction with the coupling agent.

U.S. Pat. No. 5,851,261 relates to a process for the production of polyurea encapsulated fertilizer particles. This process comprises applying an isocyanate-reactive component containing at least two amine groups to the fertilizer particles, and applying a polyisocyanate to the amine coated particles to form polyurea coated particles. The order of applying the components may also be reversed, such that the polyisocyanate is applied first, followed by the amine group containing component.

Advantages of the present invention include the fact that castor oil is a natural product that does not present any harm to the environment, encapsulants based on the combination of castor oil and polyethers result in superior slow release properties when compared to castor oil alone as described in, for example, U.S. Pat. No. 5,538,531, or to castor oils which are chemically modified with methylol groups containing resins which are commercially available. The polyesterether polyols of the present invention which comprise (1) blends of castor oil and polyether polyols, or (2) reaction products of castor oil and polyether polyols can be adjusted in reactivity using catalysts, and thus, facilitate even film formation on the fertilizer surface prior to reaction with the isocyanate which results in encapsulating layers of high homogeneity.

SUMMARY OF THE INVENTION

This invention relates to a process for the production of polyurethane encapsulated slow release fertilizer particles, and to the polyurethane encapsulated slow release fertilizer particles produced by this process.

This process comprises 1) applying a) an isocyanate-reactive component comprising a polyesterether polyol to fertilizer particles to form coated fertilizer particles, and 2) applying b) a polyisocyanate component to the coated fertilizer particles from step 1) to form polyurethane encapsulated fertilizer particles. These two steps are optionally repeated (successively) as many times as necessary to form the desired thickness of the polyurethane coating which encapsulates the fertilizer particles. The encapsulated fertilizer compositions which are produced by this process contain from about 2 to 20%, preferably 3 to 15%, most preferably 4 to 10% by weight of polyurethane, based on the total weight of the encapsulated fertilizer composition, and wherein the polyurethane forming the encapsulated fertilizer particles is characterized by a water absorption of less than 1%, preferably less than 0.5%, based on the total weight of the polyurethane encapsulant.

In a less preferred embodiment of the present invention, this process comprises 1) applying b) a polyisocyanate component to fertilizer particles to form isocyanate coated fertilizer particles, and 2) applying a) an isocyanate-reactive component comprising a polyesterether polyol to fertilizer particles to the isocyanate coated fertilizer particles from step 1) to form polyurethane encapsulated fertilizer particles. These two steps are optionally repeated (successively) as many times as necessary to form the desired thickness of the polyurethane coating which encapsulates the fertilizer particles. The encapsulated fertilizer compositions which are produced by this process contain from about 2 to 20%, preferably 3 to 15%, most preferably 4 to 10% by weight of polyurethane, based on the total weight of the encapsulated fertilizer composition, and wherein the polyurethane forming the encapsulated fertilizer particles is characterized by a water absorption of less than 1%, preferably less than 0.5%, based on the total weight of the polyurethane encapsulant.

In an alternate embodiment, this process comprises 1) mixing a) an isocyanate-reactive component comprising a polyesterether polyol and b) a polyisocyanate either continuously or in a batch process in quantities such that the ratio of isocyanate groups contained in component b) to isocyanate-reactive groups contained in component a) is from about 0.8:1 to about 2.0:1, preferably about 0.9:1 to about 1.2:1 and most preferably about 0.93:1 to about 1.1:1; followed by 2) applying the mixture to the fertilizer particles; and, optionally, 3) repeating step 2) as often as necessary to form the desired thickness of polyurethane coating encapsulating the fertilizer particles. This embodiment is less preferred due to the possibility of air entrapment during the mixing stage which can result in bubbles forming in the coating leading to a less-continuous film on the encapsulated particle. Another problem is that the thickness of the coating applied on the fertilizer particles may increase correspondingly as the viscosity of the reacting mixture does. Thus, the particles coated using the last portion of the mixture have a thicker coating than particles coated using the first portion of the mixture. However, some of these problems can be overcome by continuous mixing and application of the polyisocyanate and the polyisocyanate-reactive component.

The present invention also relates to encapsulated fertilizer compositions produced by these processes.

In accordance with the present invention, suitable polyesterether polyols comprise (i) 20 to 90% by weight, preferably 40 to 80% by weight, based on 100% by weight of a)(i) and a)(ii), of castor oil having an OH number of from 160 to 170, a viscosity of 500 to 900 mPa.s at 25° C., and a water content of less than 0.5% by weight, based on the total weight of castor oil, and (ii) 10 to 80% by weight, preferably 20 to 60% by weight, based on 100% by weight of a)(i) and a)(ii), of a polyether polyol having an OH number of from 28 to 700, preferably from 112 to 500, a functionality of from 3 to 8, preferably from 4 to 7, a molecular weight of from about 240 to about 6,000, preferably from 400 to 2,000, and a viscosity of from 50 to 35,000, preferably from 500 to 25,000 mPa.s at 25° C., and said polyether polyol being prepared by reacting at least one suitable initiator with one or more alkylene oxides wherein at least 70%, preferably at least 80%, and more preferably 100% by weight of the alkylene oxides comprises propylene oxide, based on 100% by weight of the alkylene oxides. The polyesterether polyols suitable for the present invention comprise either blends of castor oil and one or more polyether polyols, or the reaction products of castor oil and one or more polyether polyols.

DETAILED DESCRIPTION OF THE INVENTION

Suitable polyisocyanates which may be used in forming the isocyanate compositions in accordance with the present invention include monomeric diisocyanates, NCO prepolymers, and preferably liquid polyisocyanates and polyisocyanate adducts. Suitable monomeric diisocyanates may be represented by the formula $R(NCO)_2$ in which R represents an organic group obtained by removing the isocyanate groups from an organic diisocyanate having a molecular weight of about 56 to 1,000, preferably about 84 to 400. Diisocyanates preferred for the process according to the invention are those represented by the above formula in which R represents a divalent aliphatic, hydrocarbon group having 4 to 12 carbon atoms, a divalent cyclo-aliphatic hydrocarbon group having 6 to 13 carbon atoms, a divalent aliphatic hydrocarbon group having 7 to 20 carbon atoms or a divalent aromatic hydrocarbon group having 6 to 18 carbon atoms. Preferred monomeric diisocyanates are those wherein R represents an aromatic hydrocarbon group.

Examples of the suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis(4-isocya-natocyclohexyl) methane, 2,4'-dicyclohexylmethane diisocyanate, 1,3- and 1,4-bis(isocyanatomethyl) cyclohexane, bis(4-isocyanato-3-methylcyclohexyl) methane, α, α, α',α'-tetramethyl-1,3- and/or -1,4-xylylene diisocyanate, 1-isocyanato-1-methyl-4 (3)-isocyanatomethyl cyclohexane, 2,4- and/or 2,6-hexahydrotoluene diisocyanate, 1,3- and/or 1,4-phenylene diisocyanate, 2,4- and/or 2,6-toluene diisocyanate, 2,4'- and/or 4,4'-diphenylmethane diisocyanate, 1,5-diisocyanato naphthalene and mixtures thereof. Aromatic polyisocyanates containing 3 or more isocyanate groups such as 4,4',4"-triphenylmethane triisocyanate and polymethylene poly (phenylisocyanates) obtained by phosgenating aniline/formaldehyde condensates may also be used.

In accordance with the present invention, at least a portion of the polyisocyanate component may be present in the form of an NCO prepolymer or a polyisocyanate adduct, preferably a polyisocyanate adduct. Suitable polyisocyanate adducts are those containing isocyanurate, uretdione, biuret, urethane, allophanate, carbodiimide and/or oxadiazinetrione groups. The polyisocyanate adducts have an average functionality of 2.0 to 4 and an NCO content of 5 to 30% by weight. Suitable adducts/prepolymers include the following type of components:

1) Isocyanurate group-containing polyisocyanates which may be prepared as set forth in DE-PS 2,616,416, EP-OS 3,765, EP-OS 10,589, EP-OS 47,452, U.S. Pat. Nos. 4,288, 586 and 4,324,879. The isocyanato-isocyanurates generally have an average NCO functionality of 3 to 4.0, preferably of from 3.2 to 3.6, and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a, i.e., trialkyl phosphine catalyst and which may be used in admixture with other aromatic, aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906, 126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as tripropylene glycol, trimethylol propane, glycerine, 1,2-dihydroxy propane and mixtures thereof. The urethane group-containing polyisocyanates have a most preferred NCO content of 12 to 20% by weight and an (average) NCO functionality of 2.5 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 28% by weight and an (average) NCO functionality of 2 to 4.

6) Isocyanurate and allophanate group-containing polyisocyanates which may be prepared in accordance with the processes set forth in U.S. Pat. Nos. 5,124,427, 5,208,334 and 5,235,018; the disclosures of which are herein incorporated by reference.

10 7) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

Preferred polyisocyanate adducts are the polyisocyanates containing urethane groups, isocyanurate groups, biuret groups or mixtures of isocyanurate and allophanate groups.

The NCO prepolymers, which may also be used as the polyisocyanate component in accordance with the present invention, are prepared from the previously described polyisocyanates or polyisocyanate adducts, preferably monomeric diisocyanates, and organic compounds containing at least two isocyanate-reactive groups, preferably at least two hydroxy groups. These organic compounds include high molecular weight compounds having molecular weights of 500 to about 5,000, preferably 800 to about 3,000, and optionally low molecular weight compounds with molecular weights below 400. The molecular weights are number average molecular weights ($M_n$) and are determined by end group analysis (OH number). Products obtained by reacting polyisocyanates exclusively with low molecular weight compounds are polyisocyanate adducts containing urethane groups and are not considered to be NCO prepolymers.

It is preferred that the polyisocyanates of the present invention are aromatic polyisocyanates. Some examples of suitable aromatic polyisocyanates are 1,3- and/or 1,4-phenylene diisocyanate, 2,4- and/or 2,6-toluene diisocyanate, 2,4'- and/or 4,4'-diphenylmethane diisocyanate, 1,5-diisocyanato naphthalene and mixtures thereof.

It is more preferred that the polyisocyanates for the presently claimed invention are polymethylene poly (phenylisocyanate) compositions having a functionality of from about 2.1 to about 3.5, preferably 2.2 to 3.2 and most preferably of 2.3 to 2.8, and an NCO group content of about 26% to about 33.4%, preferably about 30.5% to about 33%, and a monomeric diisocyanate content of from about 20% to about 90% by weight, preferably from about 40% to about 80%, wherein the content of monomeric diisocyanate comprises up to about 5% by weight of the 2,2'-isomer, from about 1 to about 25% by weight of the 2,4'-isomer, and from about 25 to about 70% by weight of the 4,4'-isomer, based on the entire weight of the isocyanate composition. The polymeric MDI content of these isocyanates varies from about 10 to about 80% by weight, preferably from about 20% to about 60% by weight.

"Polymeric MDI" as used herein, refers to polymethylene poly(phenyl-isocyanate) which in addition to monomeric diisocyanate (i.e., two-ring compounds) contains three-ring and higher ring containing products.

Most preferred polyisocyanates include, for example, polymethylene poly(phenylisocyanate) compositions having an average functionality of from about 2.2 to about 3.2, preferably about 2.3 to about 2.8, an NCO group content of about 30 to 33% by weight, and a monomer content of from about 40 to 80% by weight, wherein the content of monomer comprises no more than about 2% by weight of the 2,2'-isomer, from about 2 to about 25% by weight of the 2,4'-isomer and from about 35 to about 60% by weight of the 4,4'-isomer, based on the entire weight of the composition. This isocyanate composition comprises from about 20 to about 60% by weight of polymeric MDI.

Also suitable are mixtures of polyisocyanate compositions as described above with adducts of MDI including, for example, allophanates of MDI as described in, for example, U.S. Pat. Nos. 5,319,053, 5,319,054 and 5,440,003, the disclosures of which are herein incorporated by reference; urethanes of MDI as described in , for example, U.S. Pat. Nos. 5,462,766 and 5,558,917, the disclosures of which are herein incorporated by reference; and carbodiimides of MDI as described in, for example, U.S. Pat. Nos. 2,853,473, 2,941,966, 3,152,162, 4,088,665, 4,294,719 and 4,244,855, the disclosures of which are herein incorporated by reference.

Isocyanate prepolymers including, for example, those based on diphenylmethane diisocyanate which may be based on either polyethers or polyesters are suitable for the present invention. Although these are typically less preferred isocyanates, these are suitable for fertilizer encapsulation processes, as long as they are liquid and can be applied according to the invention. These compounds include, for example, an isocyanate-terminated prepolymer having an NCO content of about 10%, a functionality of about 2 and a viscosity of about 2,500 mPa.s at 25° C. Such prepolymers can be prepared by, for example, reacting 2,4'-isomer rich MDI with a difunctional polyether (prepared from propylene glycol and propylene oxide).

A most preferred polyisocyanate comprises a polymethylene poly-(phenylisocyanate) having an NCO content of about 32.4%, a functionality of about 2.5, a viscosity of about 57 mPa.s at 25° C., and having a monomer content of about 61% by weight. Of the 61% monomer, about 18.0% by weight is the 2,4'-isomer of MDI, about 2% by weight is the 2,2'-isomer of MDI and about 41% is the 4,4'-isomer of MDI.

Another most preferred polyisocyanate component comprises a polymethylene poly(phenylisocyanate) having an NCO content of about 32.3%, a functionality of about 2.8, a viscosity of about 160 mPa.s at 250° C., and having a monomer content of about 45% by weight. Of the 45% by weight monomer, about 44% is the 4,4'-isomer of MDI and about 1% by weight is the 2,4'-isomer of MDI.

Diphenylmethane diisocyanate which is rich in the 2,4'-isomer is another most preferred isocyanate for the present invention. Specifically, diphenylmethane diisocyanate having an isomer distribution comprising about 44% by weight of the 4,4'-isomer, about 54% by weight of the 2,4'-isomer and about 2% by weight of the 2,2'-isomer. This diisocyanate has an NCO content of about 33.6%, a functionality of about 2.0 and a viscosity of less than about 25 mPa.s at 25° C.

Suitable polyesterether polyols to be used in accordance with the present invention include, for example, those polyesterether polyols which are either a blend of (i) castor oil and (ii) a polyether polyol, or those polyesterether polyols which are the reaction product of (i) castor oil and (ii) a polyether polyol.

In accordance with the present invention, suitable polyesterether polyols comprise (i) 20 to 90% by weight, preferably 40 to 80% by weight, based on 100% by weight of components (i) and (ii), of castor oil having an OH number of 160 to 170, a viscosity of 500 to 900 mPa.s at 25° C., and a water content of less than 0.5% by weight, based on the total weight of castor oil, and (ii) 10 to 80% by weight, preferably 20 to 60% by weight, based on 100% by weight of components (i) and (ii), of a polyether polyol having an OH number of from 28 to 700, preferably from 112 to 500, a functionality of from 3 to 8, preferably from 4 to 7, a molecular weight of from about 240 to about 6,000, preferably from about 400 to about 2,000, and a viscosity of from 50 to 35,000 mPa.s , preferably from 500 to 25,000 mPa.s, at 25° C. These polyesterether polyols can either be blends of (i) castor oil and (ii) one or more polyether polyols, or the reaction product of (i) castor oil and (ii) one or more polyether polyols.

Some examples of suitable polyether polyols include those started from initiators such as, for example, glycerol, ethanolamine, ethylene diamine, trimethylol propane, pentaerythritol, sucrose, L-arabinose, D-ribose, 2-deoxy-D-ribose, D-xylose and various other pentoses, D-glycose, D-fructose, D-mannose, D-galactose and various other hexoses, D-sedoheptulose and other heptoses, maltose, lactose, raffinose (a trisaccharide), etc., and mixtures thereof, such that the above mentioned functionality requirements are satisfied. Preferred initiators include compounds such as glycerol, ethylene diamine, trimethylol propane, pentaerythritol, sucrose, and various other sugars, etc. Particularly preferred initiators include compounds such as, for example, sucrose, sorbitol, pentaerythritol, etc. Initiators are reacted with one or more alkylene oxide to form the desired polyether polyol. It is essential that propylene oxide be present in an amount such that it is at least about 70% by weight of the total weight of alkylene oxides. The balance can be, for example, ethylene oxide, butylene oxide, tetrahydrofuran, styrene oxide, etc. It is, however, preferred that propylene oxide be present in an amount such that there is at least 80% by weight of propylene oxide, based on the total weight of the alkylene oxides. Most preferably 100% by weight of the alkylene oxides are propylene oxide.

Castor oil by itself has a limited number of OH groups representing co-reactants for the polyisocyanate. It is therefore preferred to prepare either blends or reaction products of castor oil with one or more polyether polyols which are multi-functional in terms of the number of OH groups available, such as, for example, sugar polyols. Polyols which contain high amounts of propylene oxide vs. ethylene oxide are preferred.

It is also possible to include other additives in either the isocyanate-reactive component or the polyisocyanate component prior to applying the component to the fertilizer particles. Possible additives include, for example, catalysts, preferably ones that are not toxic, flow aids, surfactants, defoamers and other additives known to those skilled in the art. Any additive which aids the formation of the polyurethane coating which encapsulates the fertilizer particles may be included in one or both of these components.

Suitable fertilizer particles for the present encapsulation process include any of the known chemical fertilizers. Some examples are ammonium sulfate, ammonium nitrate, urea, guanidine, melamine, sodium nitrate, ammonia phosphate, potassium phosphate, and combinations thereof. These fertilizer particles are obviously water soluble.

As used herein, the phrase "fertilizer particles" refers to any of the commercially available particulate fertilizers which are produced and marketed in various particle types. Some examples include granular, pelletized, dusts, pilled and prilled fertilizers.

An attrition resistant, controlled release particulate fertilizer may be prepared by applying the isocyanate-reactive component and the polyisocyanate to fertilizer particles at ambient temperature, preferably, however, preheated to a temperature of between about 60 and 105° C. The fertilizer particles are kept in continuous low shear, low impact, motion relative to each other by a mixing apparatus. Examples of suitable mixing apparatus include fluid bed, rotating drum, pan pelletizer, and any others which can provide a continuous, low shear motion of the fertilizer particles.

More specifically, attrition resistant, controlled release fertilizers may be produced by (i) providing a quantity of fertilizer particles, (ii) agitating the fertilizer particles such that a gentle mixing thereof is maintained, (iii) adding to the agitated fertilizer particles an isocyanate-reactive component comprising one or more polyesterether polyols as described above, (iv) after the isocyanate-reactive component has spread uniformly, adding to the agitated fertilizer particles a polyisocyanate component, in an amount such that the ratio of NCO groups to hydroxyl groups is from about 2.0 to about 0.8, more preferably 1.2 to 0.9, an most preferably 1.1 to 0.93, (v) allowing the polyisocyanate and the isocyanate-reactive materials to react, thus forming a solidified polyurethane coating on the fertilizer particles, and (vi) cooling the coated fertilizer particles to about or slightly above room temperature, with continuous agitation. If multiple coatings are desired to achieve slower release of the fertilizer, steps (ii) through (v) can be repeated several times.

In accordance with the present invention, it is preferred that the fertilizer particles contain less than 10% by weight of reactive functional groups, and it is particularly preferred that the fertilizer particles are free of reactive functional groups.

Metering of the streams of the polyisocyanate component and the isocyanate-reactive component onto the fertilizer particles can be continuous. It may be, however, advantageously discontinuous, when only a portion of the total amount of each of the two reactants is added and allowed to react prior to applying additional portions.

Successful application of the coatings of the present invention to particulate fertilizers depends on factors such as i) correct metering of the co-reactants, ii) fairly precise temperature control, iii) continuous movement of fertilizer particles during application of the optionally successive urethane coatings, and iv) followed by cooling to avoid agglomeration of the fertilizer particles.

In practicing the process of the present invention, the polyesterether polyol component is preferably applied to the fertilizer particles or granules prior to the addition of the first isocyanate component.

The following examples further illustrate details for the process of the present invention, and the preparation the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following components were used in the examples.

Urea Fertilizer Pellets: urea 98%, pearls, commercially available from Acros Organies Polyol A: a blend of two polyether polyols wherein the blend is characterized by an average functionality of 3.85, an average OH number of 197.5, an average molecular weight of 1,095, and a viscosity of 560 mPa.s at 25° C.; the blend comprises (i) 75% by weight of a triethanol amine initiated propylene oxide (100% by wt.) polyether polyol having a functionality of 3, an OH number of 150, a molecular weight of about 1100, and a viscosity of about 250 mPa.s at 25° C., and (ii) 25% by weight of a sucrose/propylene glycol/water initiated propylene oxide (100% by weight) polyether polyol having a functionality of about 6.2, an OH number of 340, a molecular weight of about 1000, and a viscosity of about 9,000 mPa.s at 25° C. (comparison)

Polyol B: a hydrophobic polyesterether polyol in accordance with the present invention, being characterized by a functionality of about 3.36, an OH number of about 199, a molecular weight of about 945, and a viscosity of about 800 mPa.s at 25° C., and being prepared by blending (i) 80% by weight of castor oil with (ii) 20% by weight of a sucrose/propylene glycol/water initiated propylene oxide (100% by weight) polyether polyol having a functionality of about 6.2, an OH number of 340, a molecular weight of about 1000, and a viscosity of about 9,000 mPa.s at 25° C.

Polyol C: a polyesterether polyol characterized by a functionality of about 3.4, an OH number of about 165, a molecular weight of about 1,153, and a viscosity of about 3,500 mPa.s at 25° C., and being prepared by reacting (i) 80% by weight of castor oil, with (ii) 20% by weight of a cyclohexanone-formaldehyde resin having an OH number of between 270 and 330, and a melting point of about 110–120° C., commercially available from Lawter International as polyketone aldehyde resin Krumbhaar K-1717 or Creanovn (formerly Huels America) as ketone aldehyde resin BL1201. (comparison)

Polyol D: DB castor oil having an OH number of about 164, a molecular weight of about 928, an equivalent weight of about 342, a functionality of about 2.71 and a viscosity of about 670 mPa.s at 25° C.; commercially available from CasChem, Inc.

Isocyanate A: a polymethylene poly(phenylisocyanate) containing about 66% diphenylmethane diisocyanate monomers having a 2,4'-isomer content of about 19% by weight, based on the total weight of the polymethylene poly(phenylisocyanate), and 34% of higher functionality homologs, and having an overall isocyanate group content of about 32.3% and a functionality of about 2.3.

Catalyst A: a dibutyltin dilaurate catalyst; commercially available from Air Products and Chemicals Inc. as Dabco T-12

TABLE 1 below sets forth the different polyols used in the examples in terms of the functionality, OH number, MW and % by weight propylene oxide.

was poured into an aluminum pan and placed into a 100° C. oven (the pellets were mixed 2 to 3 times while in the oven to prevent the pellets from sticking together) until they were dry and no longer stuck together (about 10 minutes). This procedure of coating and heating the pellets was repeated two more times using the same amounts of polyol and isocyanate. After the third coating, the pellets were left in the oven for 1 hour. Theoretically, this would result in about 6.24% polyurethane encapsulation, based on the total weight of the encapsulated fertilizer particles. However, the actual amount of polyurethane encapsulation was about 5.1 to 5.2% due to the loss of coating on the walls of the bottle.

Test Procedure For Slow Release Properties

After one week, the encapsulated fertilizer granules from each the examples were compared to unmodified fertilizer pellets using the following test procedure: 20 g of the fertilizer pellets were combined with 80 g of water, and stored at room temperature in a closed glass jar for 8 hrs. After this time, the solids were filtered off and the amount of solids dissolved in the aqueous phase was determined after evaporation of the water for 4 hrs in a 100° C. oven. The results are set forth in TABLE 2 below.

TABLE 1

Characteristics of Polyols A, B, C and D

|  | Polyol A | Polyol B | Polyol C | Polyol D |
| --- | --- | --- | --- | --- |
| Average Functionality | 3.85 | 3.36 | 3.4 | 2.71 |
| OH Number | 197.5 | 199 | 165 | 164 |
| Molecular Weight | 1,095 | 945 | 1,153 | 928 |
| % by Wt. Propylene Oxide | 100 | 100 | 0 | 0 |
| Viscosity mPa · s at 25° C. | 560 | 800 | 3,500 | 670 |

TABLE 2

Polyurethane Encapsulation of Urea Fertilizer Pellets and Release Rate Test Results

| Components | Example 1 Comparison | Example 2 invention | Example 3 comparison | Example 4 comparison | Example 5 comparison: uncoated urea pellets |
| --- | --- | --- | --- | --- | --- |
| Urea Pellets (Wt. in grams) | 100 | 100 | 100 | 100 | 100 |
| Polyol A (Wt. in grams) | 1.4 | | | | |
| Polyol B (Wt. in grams) | | 1.4 | | | |
| Polyol C (Wt. in grams) | | | 1.49 | | |
| Polyol D (Wt. in grams) | | | | 1.49 | |
| Isocyanate A (Wt. in grams) | 0.68 | 0.69 | 0.60 | 0.60 | |
| Catalyst A (Wt. in grams) | 0.0028 | 0.0028 | 0.0028 | 0.0028 | |
| Polyurethane Encapsulation (%) | 5.16 | 5.19 | 5.19 | 5.19 | 0 |
| Urea Dissolved after 8 hrs. storage in water (%) | 71.7 | 31.2 | 88.8 | 67.5 | 90.2 |

Encapsulation of Fertilizer Pellets

In each of the examples, the stated amount of the respective polyol component (see TABLE 2 below) was added to 100 g of urea fertilizer pellets in an 8 ounce bottle. The bottle was shaken until the polyol component was coated on the fertilizer pellets (about 2 to 3 minutes). Isocyanate A in the relevant amount was added to the polyol coated pellets, and the bottle was shaken until the isocyanate coated the polyol-coated fertilizer pellets (about 2–3 minutes). This mixture Additional polyesterether polyols were prepared by blending castor oil and Polyether Polyol 1 in relative amounts as shown in Table 3 below. The process used was essentially as described hereinabove with respect to Polyol B.

Polyether Polyol 1: a sucrose/propylene glycol/water initiated polypropylene oxide (100% by wt.) polyether polyol having a functionality of about 6.2, an OH number of about 340, a molecular weight of about 1,000 and a viscosity of about 9,000 mPa.s at 25° C.

TABLE 3

Castor Oil/Polyether Polyol Blends according to the Invention

| Example | Castor Oil (Wt. in grams) | Polyether Polyol 1 (Wt. in grams) | Equivalent Weight of Blend |
|---|---|---|---|
| Polyesterether Polyol Blend E | 90 | 10 | 308.9 |
| Polyesterether Polyol Blend F | 70 | 30 | 258.7 |
| Polyesterether Polyol Blend G | 60 | 40 | 239.3 |
| Polyesterether Polyol Blend H | 50 | 50 | 222.6 |

The encapsulation of fertilizer pellets was performed as described in Examples 1–4 above. The test procedure for slow release properties of the encapsulated fertilizer particles in Examples 7–9 below essentially corresponded to that described above.

TABLE 4

Encapsulation Results with Castor Oil/Polyether Polyol Blends According to the Invention

| Example | Example 6 | Example 7 | Example 8 | Example 9 | Example 10 |
|---|---|---|---|---|---|
| Urea (Wt. in grams) | 100 | 100 | 100 | 100 | 100 |
| Polyesterether Polyol Blend E (Wt. in grams) | 1.44 | | | | |
| Polyesterether Polyol Blend F (Wt. in grams) | | 1.36 | | | |
| Polyesterether Polyol Blend G (Wt. in grams) | | | 1.32 | | |
| Polyesterether Polyol Blend H (Wt. in grams) | | | | 1.28 | |
| Isocyanate A (Wt. in grams) | 0.65 | 0.73 | 0.77 | 0.81 | 0 |
| Catalyst A (Wt. in grams) | 0.00288 | 0.00272 | 0.00264 | 0.00256 | 0 |
| % by Wt. Catalyst A in Polyol | 0.2 | 0.2 | 0.2 | 0.2 | 0 |
| % Encapsulation | 5.19 | 5.19 | 5.19 | 5.19 | 0 |
| 8 Hr. Storage % Urea Dissolved | 48.6 | 39.1 | 36.4 | 38.7 | 92.3 |

The following components were used to prepare polyesterether polyols in accordance with the present invention. In particular, the resultant polyesterether polyols comprised the reaction products of castor oil and polyether polyols.

Polyether Polyol 2: a sorbitol initiated polypropylene oxide (100% by wt.) polyether polyol having a functionality of about 6, an OH number of about 450, a molecular weight of about 750 and a viscosity of about 15,000 mPa.s at 25° C.

Polyether Polyol 3: a pentaerythritol initiated polypropylene oxide (100% by wt.) polyether polyol having a functionality of about 4, an OH number of about 550, a molecular weight of about 410, and a viscosity of about 4,460 mPa.s at 25° C.

Polyether Polyol 4: a trimethylolpropane initiated polypropylene oxide (100% by wt.) polyether polyol having a functionality of about 3, an OH number of about 370, a molecular weight of about 450 and a viscosity of about 650 mPa.s at 25° C.

Polyesterether polyols comprising the reaction product of a polyether polyol (i.e. Polyether Polyols 1–4 above) and castor oil were prepared as follows:

To a two (2) liter flask fitted with a stirrer and a heating mantle, were added 800 grams of Castor Oil, 200 grams of the polyether polyol, and 0.025 grams of tetrabutyltitanate. The mixture was heated to 200° C. and held at this temperature for 5 hours. Details relative to the composition and characteristics of the resultant transesterified castor oil products, i.e. polyesterether polyols, are set forth in Table 5 below.

TABLE 5

Reaction Products of Castor Oil and Polyether Polyols (according to the invention)

| Example | Castor Oil (Wt. in grams) | Polyether Polyol | Polyether Polyol (Wt. in grams) | Theoretical Molecular Weight of Product | Theoretical Functionality of Product (OH) | OH Number (measured) in mg KOH/gm | Viscosity @ 25° C. (mPa · s) |
|---|---|---|---|---|---|---|---|
| Polyesterether Polyol I | 800 | Polyether Polyol 2 | 200 | 971 | 3.7 | 212 | 1,100 |
| Polyesterether Polyol J | 800 | Polyether Polyol 3 | 200 | 899 | 3.4 | 212 | 900 |
| Polyesterether Polyol K | 800 | Polyether Polyol 1 | 200 | 1026 | 3.6 | 198 | 1,025 |
| Polyesterether Polyol L | 800 | Polyether Polyol 4 | 200 | 820 | 3.0 | 202 | 70 |

A Gel Permeation Chromotography (GPC) was taken of the mixture of 800 grams of Castor Oil and 200 grams of Polyether Polyol 4 both before and after thermal treatment. A comparison of these GPC's shows a broader molecular weight distribution after the thermal treatment which indicates that transesterification occurred.

TABLE 6

Encapsulation Results with Reaction Products of Castor Oil and Polyether Polyols (according to the invention)

| Example | Example 11 | Example 12 | Example 13 | Example 14 | Example 15 Urea Comparison |
|---|---|---|---|---|---|
| Polyesterether Polyol I (Wt. in grams) | 1.37 | | | | |
| Polyesterether Polyol J (Wt. in grams) | | 1.36 | | | |
| Polyesterether Polyol K (Wt. in grams) | | | 1.4 | | |
| Polyesterether Polyol L (Wt. in grams) | | | | 1.39 | |
| Isocyanate A (Wt. in grams) | 0.72 | 0.73 | 0.69 | 0.70 | |
| Catalyst A (Wt. in grams) | 0.0027 | 0.0027 | 0.0028 | 0.0028 | |
| % Encapsulation | 5.19 | 5.19 | 5.19 | 5.19 | — |
| 8 Hr. Storage % Urea Dissolved | 54.1 | 52.6 | 52.9 | 53.8 | 90.0 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing polyurethane encapsulated, slow release fertilizer particles comprising
   1) applying
      a) an isocyanate-reactive component comprising a polyesterether polyol to fertilizer particles to form coated fertilizer particles, wherein said polyesterether polyol comprises:
         (i) 20 to 90% by weight, based on 100% by weight of a)(i) and a)(ii), of castor oil having an OH number of about 160 to about 170, a viscosity of about 500 to about 900 mPa.s, and a water content of less than 0.5% by weight, based on the total weight of castor oil, and
         (ii) 10 to 80% by weight, based on 100% by weight of a)(i) and a)(ii), of a polyether polyol having an OH number of from 28 to 700, a functionality of from 3 to 8, a molecular weight of from about 240 to about 6,000 and a viscosity of from 50 to 35,000 mPa.s at 25° C., said polyether polyol being prepared by reacting at least one suitable initiator compound with one or more alkylene oxides wherein the alkylene oxide comprise at least 70% by weight of propylene oxide, based on the 100% by weight of the alkylene oxides; and
   2) applying
      b) a polyisocyanate component onto the coated fertilizer particles from step 1) to form polyurethane encapsulated fertilizer particles, wherein these two steps are optionally repeated successively as many times as necessary, with the polyurethane encapsulated fertilizer particles from step 2) being substituted for the fertilizer particles in step 1), so as to form polyurethane encapsulated fertilizer particles containing from about 2 to about 20% by weight of polyurethane, based on the total weight of the encapsulated fertilizer composition, wherein the polyurethane forming the encapsulated fertilizer particles is characterized by a water absorption of less than 1% by weight, based on the total weight of the polyurethane encapsulant.

2. The process of claim 1, wherein a)(ii) said polyether polyol comprises a sugar initiated polyol.

3. The process of claim 1, wherein a)(ii) said polyether polyol has an OH number of from 112 to 500.

4. The process of claim 1, wherein a)(ii) said polyether polyol has a functionality of from 4 to 7.

5. The process of claim 1, wherein a)(ii) said polyether polyol has a molecular weight of from 400 to 2,000.

6. The process of claim 1, wherein a)(ii) said polyether polyol has a viscosity of from 500 to 25,000 mPa.s at 25° C.

7. The process of claim 1, wherein a)(ii) said polyether polyol is prepared by reacting a suitable initiator compound with one or more alkylene oxides wherein the alkylene oxide comprises at least 80% by weight of propylene oxide.

8. The process of claim 7, wherein the alkylene oxide comprises at least 90% by weight of propylene oxide.

9. The process of claim 1, wherein a)(ii) said polyether polyol is prepared by reacting a suitable initiator compound with an alkylene oxide, said initiator compound being selected from the group consisting of glycerol, trimethylolpropane, ethylenediamine, ethanolamine, pentaerythritol, sucrose and mixtures thereof.

10. The process of claim 1, wherein said polyesterether polyol comprises a)(i) from 40 to 80% by weight of castor oil, and a)(ii) from 20 to 60% by weight of a polyether polyol having an OH number of from 112 to 500, a functionality of from 4 to 7, a molecular weight of from 400 to 2,000, and a viscosity of from 500 to 25,000 mPa.s at 25° C.

11. The process of claim 1, wherein a) said polyesterether polyol comprises the reaction product of (i) said castor oil, and (ii) said polyether polyol.

12. The process of claim 1, wherein a) said polyesterether polyol comprises a blend of (i) said castor oil, and (ii) said polyether polyol.

13. The process of claim 10, wherein the formed polyurethane encapsulated fertilizer particles contain from about 3 to about 15% by weight of polyurethane, based on the total weight of the encapsulated fertilizer composition, and wherein the polyurethane forming the encapsulated fertilizer particles is characterized by a water absorption of less than 0.5% by weight, based on the total weight of the polyurethane encapsulant.

14. The process of claim 13, wherein the formed polyurethane encapsulated fertilizer particles contain from about 4 to about 10% by weight of polyurethane, based on the total weight of the encapsulated fertilizer composition.

15. The process of claim 1, wherein the fertilizer particles contain less than 10% by weight of reactive functional groups.

16. A process for producing polyurethane encapsulated, slow release fertilizer particles comprising:
   1) applying
      a) a polyisocyanate component to fertilizer particles to form polyisocyanate coated fertilizer particles, and
   2) applying
      b) an isocyanate-reactive component comprising a polyesterether polyol onto the polyisocyanate coated fertilizer particles from step 1) to form polyurethane encapsulated fertilizer particles, wherein said polyesterether polyol comprises:
         (i) 20 to 90% by weight, based on 100% by weight of a)(i) and a)(ii), of castor oil having an OH number of about 160 to about 170, a viscosity of about 500 to about 900 mPa.s, and a water content of less than 0.5% by weight, based on the total weight of castor oil, and
         (ii) 10 to 80% by weight, based on 100% by weight of a)(i) and a)(ii), of a polyether polyol having an OH number of from 28 to 700, a functionality of from 3 to 8, a molecular weight of from about 240 to about 6,000 and a viscosity of from 50 to 35,000 mPa.s at 25° C., said polyether polyol being prepared by reacting at least one suitable initiator compound with one or more alkylene oxides wherein the alkylene oxide comprise at least 70% by weight of propylene oxide, based on the 100% by weight of the alkylene oxides;
wherein these two steps are optionally repeated successively as many times as necessary, with the polyurethane encapsulated fertilizer particles from step 2) being substituted for the fertilizer particles in step 1), so as to form polyurethane encapsulated fertilizer particles containing from about 2 to about 20% by weight of polyurethane, based on the total weight of the encapsulated fertilizer composition, wherein the polyurethane forming the encapsulated fertilizer particles is characterized by a water absorption of less than 1% by weight, based on the total weight of the polyurethane encapsulant.

17. The process of claim 16, wherein a)(ii) said polyether polyol comprises a sugar initiated polyol.

18. The process of claim 16, wherein a)(ii) said polyether polyol has an OH number of from 112 to 500.

19. The process of claim 16, wherein a)(ii) said polyether polyol has a functionality of from 4 to 7.

20. The process of claim 16, wherein a)(ii) said polyether polyol has a molecular weight of from 400 to 2,000.

21. The process of claim 16, wherein a)(ii) said polyether polyol has a viscosity of from 500 to 25,00 mPa.s at 25° C.

22. The process of claim 16, wherein a)(ii) said polyether polyol is prepared by reacting a suitable, initiator compound with one or more alkylene oxides wherein the alkylene oxide comprises at least 80% by weight of propylene oxide.

23. The process of claim 22, wherein the alkylene oxide comprises at least 90% by weight propylene oxide.

24. The process of claim 16, wherein a)(ii) said polyether polyol is prepared by reacting a suitable initiator compound with an alkylene oxide, said initiator compound being selected from the group consisting of glycerol, trimethylolpropane, ethylenediamine, ethanolamine, pentaerythritol, sucrose and mixtures thereof.

25. The process of claim 16, wherein said polyesterether polyol comprises a)(i)l from 40 to 80% by weight of castor oil, and a)(ii) from 20 to 60% by weight of a polyether polyol having an OH number of from 112 to 500, a functionality of from 4 to 7, a molecular weight of from 400 to 2,000, and a viscosity of from 500 to 25,000 mPa.s at 25° C.

26. The process of claim 6, wherein a) said polyesterether polyol comprises the reaction product of (i) said castor oil, and (ii) said polyether polyol.

27. The process of claim 16, wherein a) said polyesterether polyol comprises a blend of said castor oil, and (ii) said polyether polyol.

28. The process of claim 25, wherein the formed polyurethane encapsulated fertilizer particles contain from about 3 to about 15% by weight of polyurethane, based on the total weight of the encapsulated fertilizer composition, and wherein the polyurethane forming the encapsulated fertilizer particles is characterized by a water absorption of less than 0.5% by weight, based on the total weight of the polyurethane encapsulant.

29. The process of claim 28, wherein the formed polyurethane encapsulated fertilizer particles contain from about 4 to about 10% by weight of polyurethane, based on the total weight of the encapsulated fertilizer composition.

30. The process of claim 16, wherein the fertilizer particles contain less than 10% by weight of reactive functional groups.

31. A process for producing polyurethane encapsulated, slow release fertilizer particles comprising:
   1) mixing
      a) an isocyanate-reactive component comprising a polyesterether polyol which comprises:
         (i) 20 to 90% by weight, based on 100% by weight of a)(i) and a)(ii), of castor oil having an OH number of about 160 to about 170, a viscosity of about 500 to about 900 mPa.s at 25° C., and a water content of less than 0.5% by weight, based on the total weight of castor oil, and
         (ii) 10 to 80% by weight, based on 100% by weight of a)(i) and a)(ii), of a polyether polyol having an OH number of from 28 to 700, a functionality of from 3 to 8, a molecular weight of from about 240 to about 6,000, and a viscosity of from 50 to 35,000 mPa.s at 25° C., said polyether polyol being prepared by reacting at least one suitable initiator compound with one or more alkylene oxides wherein the alkylene oxides comprise at least 70% by weight of propylene oxide, based on 100% by weight of the alkylene oxides; and
      b) a polyisocyanate component, in quantities such that the ratio of isocyanate groups in b) to isocyanate-reactive groups in a) is from about 0.8:1 to about 2.0:1, and
   2) applying the mixture formed in 1) to fertilizer particles, to form polyurethane encapsulated fertilizer particles, wherein step 2) is optionally repeated (successively) as many times as necessary, with the polyurethane encapsulated fertilizer particles formed in step 2) being substituted for the fertilizer particles, so as to form polyurethane encapsulated fertilizer particles containing from about 2 to about 20% by weight of polyurethane, based on the total weight of the encapsulated fertilizer composition, wherein the polyurethane forming the encapsulated fertilizer particles is characterized by a water absorption of less than 1% by weight, based on the total weight of the polyurethane encapsulant.

32. The process of claim 31, wherein a)(ii) said polyether polyol comprises a sugar initiated polyol.

33. The process of claim 31, wherein a)(ii) said polyether polyol has an OH number of from 112 to 500.

34. The process of claim 31, wherein a)(ii) said polyether polyol has a functionality of from 4 to 7.

35. The process of claim 31, wherein a)(ii) said polyether polyol has a molecular weight of from 400 to 2,000.

36. The process of claim 31, wherein a)(ii) said polyether polyol has a viscosity of from 500 to 25,000 mPa.s at 25° C.

37. The process of claim 31, wherein a)(ii) said polyether polyol is prepared by reacting a suitable initiator compound with one or more alkylene oxides wherein the alkylene oxide comprises at least 80% by weight of propylene oxide.

38. The process of claim 37, wherein the alkylene oxide comprises at least 90% by weight of propylene oxide.

39. The process of claim 31, wherein a)(ii) said polyether polyol is prepared by reacting a suitable initiator compound with an alkylene oxide, said initiator compound being selected from the group consisting of glycerol, trimethylolpropane, ethylenediamine, ethanolamine, pentaerythritol, sucrose and mixtures thereof.

40. The process of claim 31, wherein said polyesterether polyol comprises a)(i)l from 40 to 80% by weight of castor oil, and a)(ii) from 20 to 60% by weight of a polyether polyol having an OH number of from 112 to 500, a functionality of from 4 to 7, a molecular weight of from 400 to 2,000, and a viscosity of from 500 to 25,000 mPa.s at 25° C.

41. The process of claim 31, wherein a) said polyester-ether polyol comprises the reaction product of (i) said castor oil, and (ii) said polyether polyol.

42. The process of claim 31, wherein a) said polyester-ether polyol comprises a blend of (i) said castor oil, and (ii) said polyether polyol.

43. The process of claim 40, wherein the formed polyurethane encapsulated fertilizer particles contain from about 3 to about 15% by weight of polyurethane, based on the total weight of the encapsulated fertilizer composition, and wherein the polyurethane forming the encapsulated fertilizer particles is characterized by a water absorption of less than 0.5% by weight, based on the total weight of the polyurethane encapsulant.

44. The process of claim 43, wherein the formed polyurethane encapsulated fertilizer particles contain from about 4 to about 10% by weight of polyurethane, based on the total weight of the encapsulated fertilizer composition.

45. The process of claim 31, wherein the fertilizer particles contain less than 10% by weight of reactive functional groups.

46. The polyurethane encapsulated, slow release fertilizer particles produced by the process of claim 1.

47. The polyurethane encapsulated, slow release fertilizer particles produced by the process of claim 16.

48. The polyurethane encapsulated, slow release fertilizer particles produced by the process of claim 31.

* * * * *